US008643012B2

(12) United States Patent
Oh et al.

(10) Patent No.: US 8,643,012 B2
(45) Date of Patent: Feb. 4, 2014

(54) DISPLAY SUBSTRATE AND METHOD FOR MANUFACTURING THE SAME

(75) Inventors: Min-Seok Oh, Yongin-si (KR); Bong-Kyu Shin, Bucheon-si (KR); Sang-Gab Kim, Seoul (KR); Eun-Guk Lee, Yongin-si (KR); Hong-Kee Chin, Suwon-si (KR); Yu-Gwang Jeong, Yongin-si (KR); Seung-Ha Choi, Shiheung-si (KR)

(73) Assignee: Samsung Display Co., Ltd. (KR)

( * ) Notice: Subject to any disclaimer, the term of this patent is extended or adjusted under 35 U.S.C. 154(b) by 75 days.

(21) Appl. No.: 12/952,744

(22) Filed: Nov. 23, 2010

(65) Prior Publication Data

US 2011/0062445 A1 Mar. 17, 2011

Related U.S. Application Data

(62) Division of application No. 11/682,907, filed on Mar. 7, 2007, now Pat. No. 7,863,065.

(30) Foreign Application Priority Data

May 2, 2006 (KR) .......................... 10-2006-0039445

(51) Int. Cl.
*H01L 29/04* (2006.01)
(52) U.S. Cl.
USPC ...................... 257/59; 257/72; 257/E29.151
(58) Field of Classification Search
USPC ................. 257/59, 72, E29.151; 438/30, 149
See application file for complete search history.

(56) References Cited

U.S. PATENT DOCUMENTS

| 6,468,822 B2* | 10/2002 | Maeda et al. ............. 438/30 |
| 6,586,286 B2* | 7/2003 | Park et al. ............... 438/155 |
| 6,838,696 B2* | 1/2005 | Kobayashi et al. ........ 257/57 |
| 6,882,376 B2* | 4/2005 | Kim et al. ................ 349/43 |
| 7,205,571 B2* | 4/2007 | Ahn et al. ................ 257/72 |
| 2002/0057394 A1* | 5/2002 | Takahashi et al. ......... 349/43 |
| 2006/0038178 A1* | 2/2006 | Youn ...................... 257/59 |
| 2006/0145161 A1* | 7/2006 | Lee et al. ................ 257/72 |

FOREIGN PATENT DOCUMENTS

| KR | 1020030033785 A | 5/2003 |
| KR | 1020060016920 A | 2/2006 |

* cited by examiner

*Primary Examiner* — Michael Trinh
(74) *Attorney, Agent, or Firm* — Cantor Colburn LLP

(57) ABSTRACT

A method of forming a display substrate includes forming an array layer on a substrate, forming a passivation layer on the array layer, forming a photoresist pattern on the passivation layer corresponding to a gate line, a source line and a thin-film transistor of the array layer, etching the passivation layer using the photoresist pattern as a mask, Non-uniformly surface treating a surface of the photoresist pattern, forming a transparent electrode layer on the substrate having the surface-treated photoresist pattern formed thereon and forming a pixel electrode. The forming a pixel electrode includes removing the photoresist pattern and the transparent electrode layer, such as by infiltrating a strip solution into the surface-treated photoresist pattern.

7 Claims, 14 Drawing Sheets

DISPLAY SUBSTRATE AND METHOD FOR MANUFACTURING THE SAME

CROSS REFERENCE TO RELATED APPLICATIONS

This application is a divisional application of U.S. patent application Ser. No. 11/682,907 filed Mar. 7, 2007, now U.S. Pat. No. 7,863,065, which claims priority to Korean Patent Application No. 2006-39445 filed on May 2, 2006, and all the benefits accruing therefrom under 35 U.S.C. §119, the contents of which are herein incorporated by reference in their entirety.

BACKGROUND OF THE INVENTION

1. Field of the Invention

The present invention relates to a display substrate and a method for manufacturing a display substrate. More particularly, the present invention relates to a display substrate and a method for manufacturing a display substrate, capable of enhancing reliability of a manufacturing process.

2. Description of the Related Art

A liquid crystal display ("LCD") device includes a display substrate, an opposite substrate and a liquid crystal layer that is interposed between the display substrate and the opposite substrate. A plurality of gate lines and a plurality of source lines that intersect the gate lines are formed on the display substrate. In addition, a thin-film transistor ("TFT") that is electrically connected to one of the gate lines and one of the source lines, and a pixel electrode that is electrically connected to the TFT are formed on the display substrate. The TFT includes a gate electrode, a channel, a source electrode and a drain electrode. The gate electrode is extended from a gate line. The channel is electrically isolated from the gate electrode and overlaps with the gate electrode. The source electrode is formed from the source line and is electrically connected to the channel. The drain electrode is electrically isolated from the source electrode and is electrically connected to the channel.

In order to manufacture a display substrate, a mask is required. In order to reduce manufacturing time and costs, significant effort has gone into reducing the required number of masking processes. For example, a five-mask process is a manufacturing process in which five masks are used in five processes, one for each process: a gate metal patterning process, a channel patterning process, a source metal patterning process, a passivation layer patterning process and a pixel electrode patterning process. A four-mask process is a manufacturing process in which a channel patterning process and a source metal patterning process are performed using one mask in the five-mask process. Recently, a three-mask process has been developed, which is a manufacturing process in which a passivation layer patterning process and a pixel electrode patterning process are performed by one mask in the four-mask process.

In the three-mask process, for example, a lift-off method is used. The lift-off method is that in which a strip solution is infiltrated into an undercut region between a passivation layer and a photoresist pattern, and then the photoresist pattern and a transparent electrode layer that is formed on the photoresist pattern are simultaneously removed to pattern a pixel electrode. However, the undercut is difficult to manufacture in mass production facilities, and thus reliability of a pixel electrode patterning process may be decreased. Also, in order to filter out a floating substance, such as a transparent electrode layer that is separated by the lift-off method, a filter exchanging period for the strip solution may unfortunately be reduced.

BRIEF SUMMARY OF THE INVENTION

An exemplary embodiment provides a display substrate.

An exemplary embodiment provides a method for manufacturing a display substrate capable of enhancing reliability of a manufacturing process and capable of reducing manufacturing costs.

In an exemplary embodiment, a display substrate includes a first metal pattern, a second metal pattern, a passivation layer and a pixel electrode. The first metal pattern includes a plurality of gate lines extended to a first direction and a gate electrode of a thin-film transistor ("TFT"). The second metal pattern includes a plurality of source lines, a source electrode and a drain electrode of the TFT. The source lines are extended to a second direction perpendicular to the first direction. The passivation layer is formed on the gate lines, the source lines and the TFT. The pixel electrode contacts a side surface of the drain electrode. The pixel electrode overlaps with a passivation layer on the drain electrode, the passivation layer being extended from the side surface.

In an exemplary embodiment, a method of manufacturing a display substrate includes forming an array layer on a substrate. The array layer includes a plurality of gate lines, a plurality of source lines and a thin-film transistor ("TFT") electrically connected to one of the gate lines and one of the source lines. A passivation layer is formed on the array layer. A photoresist pattern is formed on the passivation layer corresponding to the gate line, the source line and the TFT. The passivation layer is etched using the photoresist pattern as a mask. A surface of the photoresist pattern is non-uniformly surface-treated. A transparent electrode layer is formed on the substrate having the surface-treated photoresist pattern formed thereon. A pixel electrode is formed by removing the photoresist pattern and the transparent electrode layer. The removing the photoresist pattern and the transparent electrode layer includes infiltrating a strip solution into the surface-treated photoresist pattern.

In an exemplary embodiment, a method of manufacturing a display substrate includes forming an array on a substrate. The array layer includes a plurality of gate lines, an insulation layer covering the gate lines, a plurality of source lines and a TFT electrically connected to one of the gate lines and one of the source lines. A passivation layer is formed on the array layer. A photoresist pattern is formed on the passivation layer corresponding to the gate line, the source line and the TFT. A side surface of an output terminal of the TFT is exposed. The exposing of the side surface includes etching the passivation layer and the insulation layer, such as using the photoresist pattern. The passivation layer of the output terminal is exposed. The exposing of the passivation layer of the output terminal includes removing a portion of the photoresist pattern. A transparent electrode layer is formed on the substrate having the exposed side surface of an output terminal formed thereon. A pixel electrode is formed by simultaneously removing the photoresist pattern and the transparent electrode layer of the photoresist pattern. The pixel electrode contacts the side surface and overlaps with the passivation layer.

In an exemplary embodiment of the method for manufacturing a display substrate and the display substrate manufactured by the same, a strip solution is selectively infiltrated into amorphous indium tin oxide ("a-ITO"), formed on the photoresist pattern because the surface of the photoresist pattern is non-uniformly formed, such that a process for forming a pixel electrode may be simplified.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
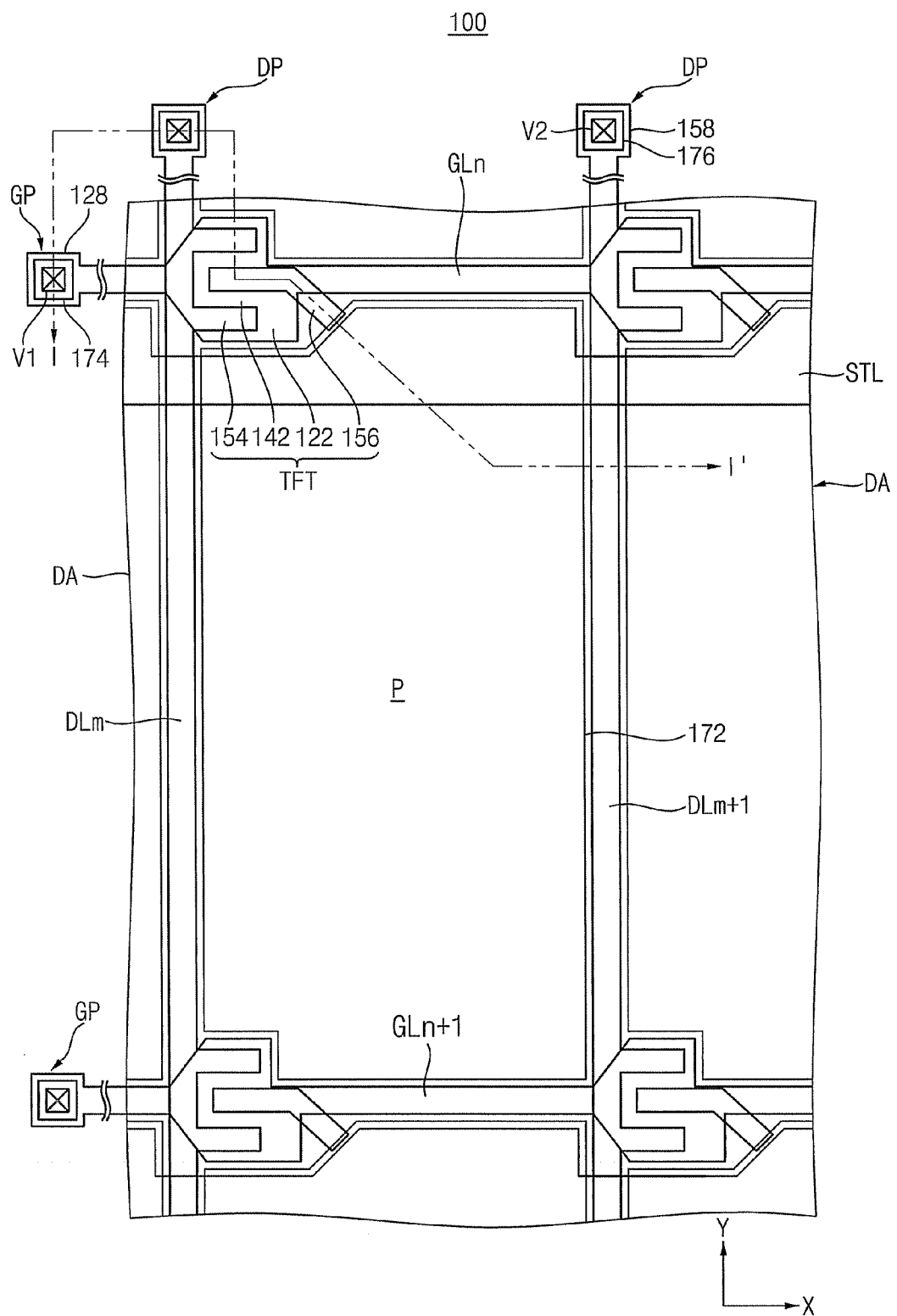
FIG. 1 is a plane view illustrating an exemplary embodiment of a display substrate according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below," "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
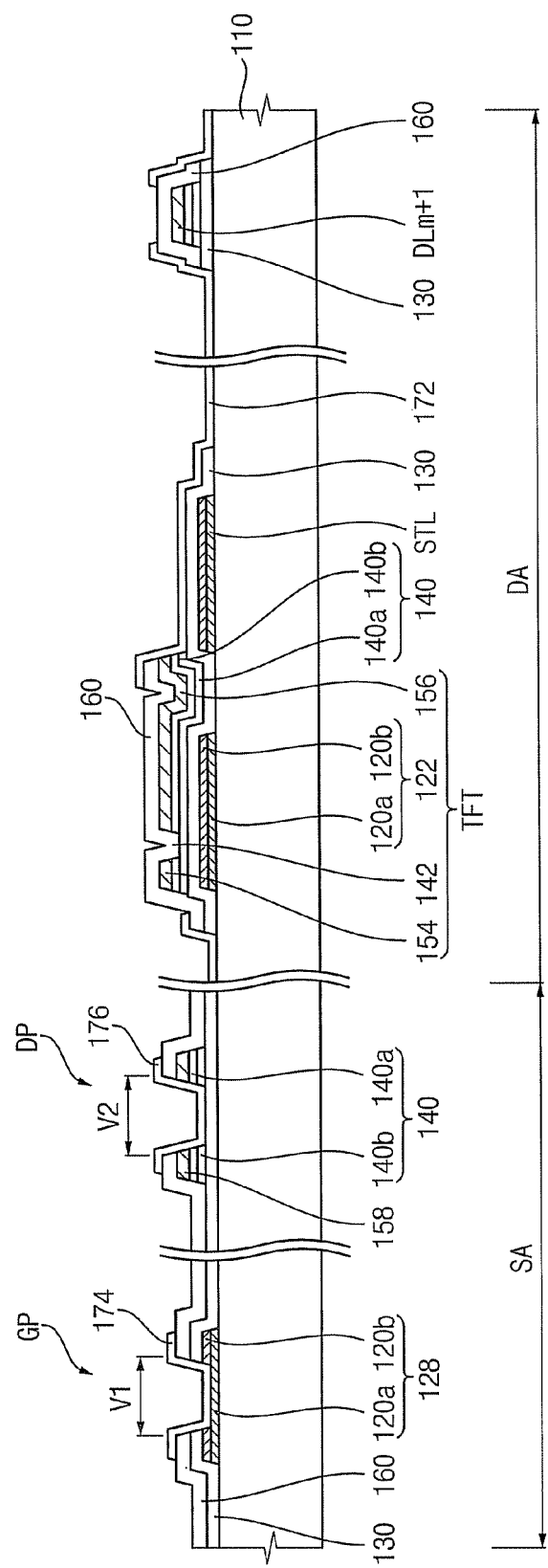
FIG. 2 is a cross-sectional view taken along line I-I' in FIG. 1.

FIG. 1 is a plane view illustrating an exemplary embodiment of a display substrate according to the present invention. FIG. 2 is a cross-sectional view taken along line I-I' in FIG. 1.

Referring to FIGS. 1 and 2, an array substrate 100 includes a base substrate 110. A thin-film transistor ("TFT") array layer is formed on the base substrate 110. The TFT array layer includes a plurality of gate lines GLn and GLn+1, a plurality of source lines DLm and DLm+1, a gate insulation layer 130 and a TFT formed on the base substrate 110.

For orientation purposes, a Cartesian coordinate system may be used where a first side of the array substrate extends along an X-axis direction, and a second side of the array substrate extends along a Y-axis direction, where the Y-axis is substantially perpendicular to the X-axis.

The gate lines GLn and GLn+1 may be formed from a gate metal layer and are extended substantially along a first direction 'X'.

In exemplary embodiments, the gate metal layer may include, but is not limited to, a metallic material, such as chromium (Cr), aluminum (Al), tantalum (Ta), molybdenum (Mo), titanium (Ti), tungsten (W), copper (Cu), silver (Ag), etc., or a metal alloy thereof.

In an exemplary embodiment, the gate metal layer may be deposited on the base substrate 110 by using a sputtering process, a chemical vapor deposition ("CVD") process or other process suitable for the purpose described herein.

The gate metal layer may have at least two layers of metallic materials having different physical characteristics from each other. In one exemplary embodiment, the gate metal layer may include a first metal layer 120a and a second metal layer 120b that is sequentially formed on the first metal layer 120a. The first metal layer 120a may include at least one of aluminum (Al) and an aluminum alloy. The second metal layer 120b may include at least one of molybdenum (Mo) and a molybdenum (Mo) alloy.

The storage common line STL is formed from the gate metal layer. The storage common line STL extending in the first direction 'X' is formed between the gate lines GLn and GLn+1.

The source lines DLm and DLm+1 are extended along a second direction 'Y' that intersects the first direction 'X'. The source lines DLm and DLm+1 intersect the gate lines GLn and GLn+1 to define a plurality of pixel parts P. The pixel parts P correspond to a plurality of display areas DA that displays images. As used herein, "corresponding" is used to indicate corresponding substantially in positional placement relative to other elements.

A gate pad GP and a source pad DP are formed in a peripheral area SA surrounding the display area DA. The gate pad GP and the source pad DP correspond to end portions of the gate lines GLn and GLn+1 and end portions of the source lines DLm and DLm+1, respectively.

The source lines DLm and DLm+1 are formed from a source metal layer. In exemplary embodiments, the source metal layer may include, but is not limited to, a metallic material, such as chromium (Cr), aluminum (Al), tantalum (Ta), molybdenum (Mo), titanium (Ti), tungsten (W), copper (Cu), silver (Ag), etc., or a metal alloy thereof.

In an exemplary embodiment, the source metal layer may be deposited on the base substrate 110 by using a sputtering process, a CVD process or other process suitable for the purpose described herein. The source metal layer may have at least two layers of metallic materials having different physical characteristics from each other. In one exemplary embodiment, the source metal layer, in substantially the same way as the second metal layer 120b, may be formed from at least one of molybdenum (Mo) and a molybdenum (Mo) alloy.

In the display area DA, the gate insulation layer 130 is formed on a gate pattern that is formed from the gate metal layer corresponding to the gate lines. In an exemplary embodiment, the gate metal layer, the gate pattern (e.g., lines) GLn and GLn+1 and the storage common line STL may be formed from the same layer.

The gate insulation layer 130 is formed on a lower portion of a source pattern corresponding to the source lines. The source patterns (e.g. lines), DLm and DLm+1, and the source metal layer may be formed from the same layer. In one exemplary embodiment the gate insulation layer 130 may include, but is not limited to, silicon nitride ($SiN_x$), silicon oxide ($SiO_x$), etc. The gate insulation layer 130 electrically isolates the gate pattern from the source pattern.

In the peripheral area SA, the gate insulation layer 130 may be formed on an entire portion of the surface of the base substrate 110 that corresponds to the peripheral area SA, except for the gate pattern and the source pattern.

A TFT is formed on each of the pixel parts P. The TFT includes a gate electrode 122 that is extended from the gate line GLn, a source electrode 154 that is extended from the source line DLm and a drain electrode 156 that is electrically connected to a pixel electrode 172. The drain electrode 156, the source lines DLm and DLm+1 and the source electrode 154 may be formed from the same source metal layer. When a timing signal is applied to the gate electrode 122, the drain electrode 156 receives a pixel voltage from the source electrode 154 and applies the pixel voltage to the pixel electrode 172.

Referring to FIG. 2, the TFT further includes a channel layer 140 that overlaps with the gate electrode 122. The channel layer 140 is formed on the gate insulation layer 130 and contacts the source and drain electrodes 154 and 156. The channel layer 140 includes an activation layer 140a and an ohmic contact layer 140b. The activation layer 140a includes amorphous silicon (a-Si). The ohmic contact layer 140b includes amorphous silicon (n+ a-Si) doped with n-type dopants at a high concentration. The channel layer 140 is also formed on an upper portion of the source lines DLm and DLm+1.

The channel layer 140 corresponds to a separating portion between the source electrode 154 and the drain electrode 156. The channel layer 140 further includes a channel portion 142 that exposes the activating layer 140a whereby the ohmic contact layer 140b has been removed.

A passivation layer 160 is formed on a TFT array layer. The TFT array layer includes the gate lines GLn and GLn+1, the storage common line STL, the source lines DLm and DLm+1, the gate insulation layer 130 and the TFT.

In exemplary embodiments, the passivation layer 160 may include, but is not limited to, silicon nitride ($SiN_x$) or silicon oxide ($SiO_x$). The passivation layer 160 is formed in the display area DA and corresponding to the gate lines GLn and GLn+1, the source lines DLm and DLm+1 and the TFT. In an alternative embodiment, the passivation layer 160 may be formed on the entire surface of the peripheral area SA.

The passivation layer 160 that is formed on the TFT may be formed to fully cover an end surface, such as an etched end surface, of the transistor TFT. The passivation layer 160 exposes the etched end surface (hereinafter "side surface") corresponding to an end portion of the drain electrode 156.

The pixel electrode 172 that is formed corresponding to each of the pixel parts P may include a transparent conductive material. In an exemplary embodiment, the pixel electrode 172 may include, but is not limited to, amorphous indium tin oxide ("a-ITO"). The pixel electrode 172 is electrically connected to a side surface of the drain electrode 156. Therefore, the pixel electrode 172 receives a pixel voltage from the drain electrode 156 of the TFT. In an alternative exemplary embodiment, the pixel electrode 172 is partially overlapped with a portion of the passivation layer 160 proximate to the drain electrode 156. Therefore, contact reliability of the pixel electrode 172 may be enhanced when the pixel electrode 172 electrically contacts a side surface of the drain electrode 156.

A storage capacitor (not shown) is formed in a partially overlapped area between the storage common line STL and the pixel electrode 172. The storage capacitor is a dielectric defined by the gate insulation layer 130. The storage capacitor maintains a pixel voltage that is applied to the pixel electrode 172 during one frame interval.

Hereinafter, the gate pad GP and the source pad DP formed in the peripheral area SA will be described in detail.

The gate pad GP includes a gate end portion pattern 128 and a first electrode 174. The gate end portion pattern 128 is formed in an end portion of the gate line GLn as illustrated in FIG. 1. The first electrode 174 contacts the gate end portion pattern 128 through a first via hole V1 that is formed within the gate insulation layer 130 and the passivation layer 160 corresponding to the gate end portion pattern 128. In an exemplary embodiment, the first electrode 174 and the pixel electrode 172 may be formed from the same layer.

In the gate end portion pattern 128 corresponding to the first via hole V1, the second metal layer 120b is etched, such that a surface of the first metal layer 120a and an end surface of the second metal layer 120b are exposed. Therefore, the first electrode 174 contacts the surface of the first metal layer 120a and the etched end portion of the second metal layer 120b.

A size of the first electrode 174 is greater than a size of the first via hole V1 when viewed on a plane (See, FIG. 1), such that the first electrode 174 is partially overlapped with a portion of the passivation layer 160 that is formed in a peripheral area of the first via hole V1.

A contact resistance between the first metal layer 120a and the first electrode 174 is relatively high, such that an electrical contact between the gate end portion pattern 128 and the first electrode 174 may be performed through a contact of the second metal layer 120b. Contact reliability between the first electrode 174 and the second metal layer 120b is important. In an exemplary embodiment, the first electrode 174 is extended to overlap with a peripheral area of the first via hole V1 (e.g., creating an "overlapping area"), such that contact reliability of the first electrode 174 contacting the etched end surface of the second metal layer 120b may be enhanced.

The source pad DP includes a source end pattern 158 and a second electrode 176. Each of the source end portions 158 is formed in each of end portions of the source lines DLm and DLm+1, respectively. Therefore, the channel layer 140 is formed below the source end portion pattern 158 (See, FIG. 2). The second electrode 176 contacts the source end portion pattern 158 through a second via hole V2 that is formed within the passivation layer 160 and corresponding to the source end portion pattern 158.

The source end portion pattern 158 and a channel layer 140 below the source end portion pattern 158 are etched corresponding to the second via hole V2. Therefore, a surface of the source end portion pattern 158, a surface of the channel layer 140 and a portion of the gate insulation layer 130 are exposed in the second via hole V2.

In an exemplary embodiment, the second electrode 176, the pixel electrode 172 and the first electrode 174 may be formed from the same layer. The second electrode 176 is electrically connected to the source line DL through the etched surface of the source end portion pattern 158.

A size of the second electrode 176 is greater than that of the second via hole V2 (See, FIG. 1), and the second electrode 176 overlaps with the passivation layer 160 at a peripheral area of the second via hole V2 (See, FIG. 2). Advantageously, contact reliability of the second electrode 176 may be enhanced, when the second electrode 176 electrically contacts the etched surface of the source end portion pattern 158.

Hereinafter, a method of manufacturing a display substrate according to the exemplary embodiment of the present invention will be described in detail.

FIGS. 3 to 10, 12 and 15 are cross-sectional views illustrating an exemplary embodiment of a method of manufacturing an array substrate in FIG. 2.

Figure 3:
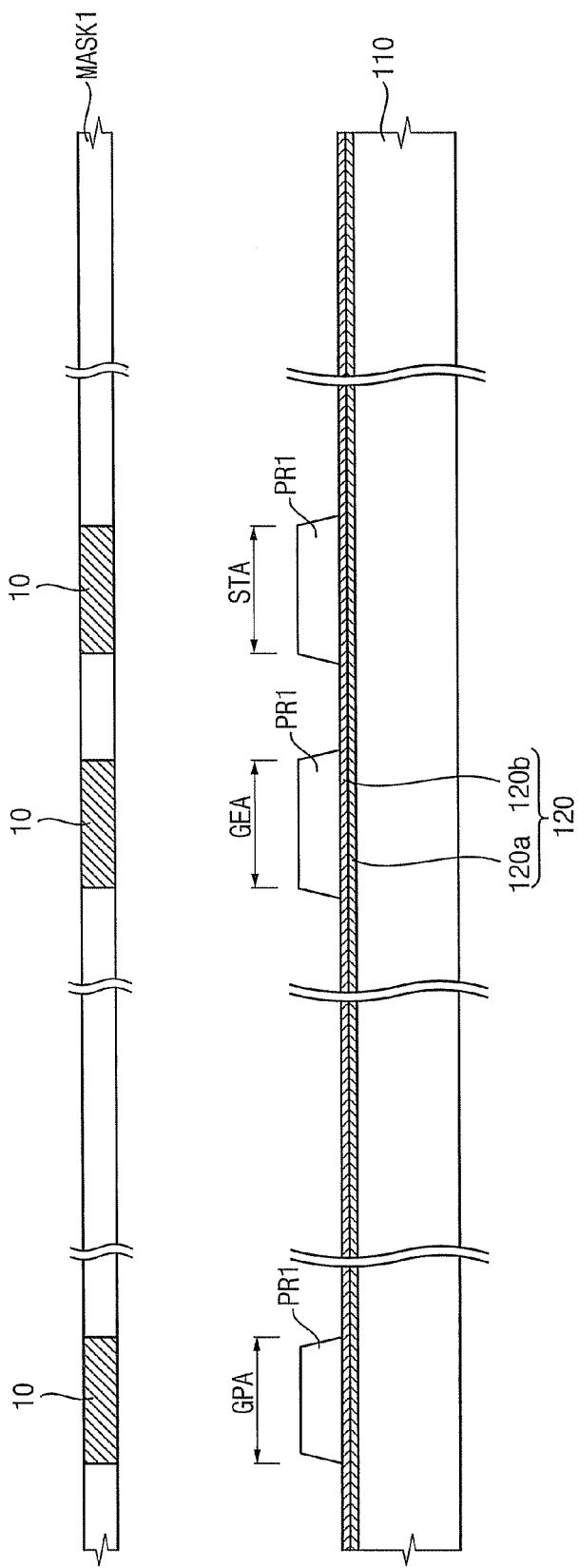
FIGS. 3 to 10, 12 and 15 are cross-sectional views illustrating an exemplary embodiment of a method of manufacturing an array substrate in FIG. 2.

Referring to FIGS. 1 and 3, a gate metal layer 120 is deposited on a base substrate 110. The depositing may include using a sputtering process, a CVD process or other process suitable for the purpose described herein. The gate metal layer 120 may include, but is not limited to, a metallic material, such as chromium (Cr), aluminum (Al), tantalum (Ta), molybdenum (Mo), titanium (Ti), tungsten (W), copper (Cu), silver (Ag), etc., or a metal alloy thereof.

The gate metal layer 120 may have at least two layers of metallic materials having different physical characteristics from each other. In one exemplary embodiment, the gate metal layer may include a first metal layer 120a and a second metal layer 120b sequentially formed on the first metal layer 120a. The first metal layer 120a may include at least one of aluminum (Al) and an aluminum alloy. The second metal layer 120b may include at least one of molybdenum (Mo) and a molybdenum (Mo) alloy.

A first photoresist layer is formed on the base substrate 110 having the gate metal layer 120 formed thereon. The first photoresist layer may be patterned to form a first photoresist pattern PR1. The patterning of the first photoresist layer may include using a photolithographic process that uses a first mask MASK1. In one exemplary embodiment, the first photoresist layer may include a positive photoresist. Alternatively, the first photoresist layer may include a negative photoresist.

When the first photoresist layer includes a positive photoresist, a light blocking pattern 10 is formed on the first mask MASK1 corresponding to an area for forming the first photoresist pattern PR1.

The first photoresist pattern PR1 is formed on a gate line area (not shown) in which the gate lines GLn and GLn+1 are formed, a gate pad area GPA in which the gate pad GP is formed, a gate electrode area GEA in which a gate electrode 122 of the TFT is formed, and a storage area STA in which the storage common line STL is formed.

Figure 4:
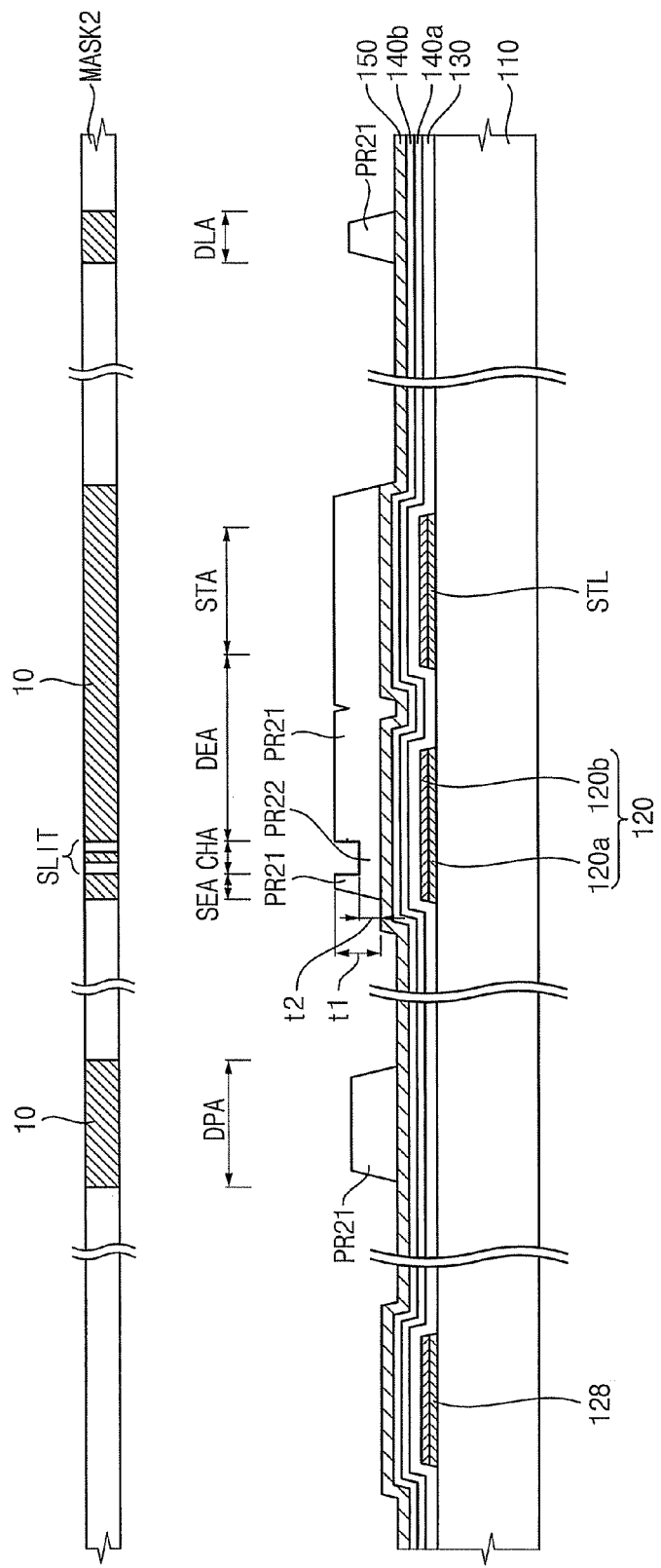

Referring to FIGS. 1 and 4, the gate metal layer 120 is patterned to form a gate pattern by using the first photoresist pattern PR1. The gate pattern includes the gate lines GLn and GLn+1, the gate end portion pattern 128, the gate electrode 122 and the storage common line STL.

Referring to FIG. 4, a gate insulation layer 130 is formed on the base substrate 110 having the gate pattern formed thereon. The gate insulation layer 130 may include, but is not limited to, silicon nitride ($SiN_x$) or silicon oxide ($SiO_x$). Forming the gate insulation layer 130 may include using plasma-enhanced CVD ("PEC"VD). In an exemplary embodiment, the gate insulation layer 130 may have a double-layer structure in which forming processes for each layer are different from each other.

An activation layer 140a, such as having amorphous silicon (a-Si) for forming a semiconductor layer, is formed on the gate insulation layer 130. An ohmic contact layer 140b, such as having amorphous silicon (n+ a-Si) doped with n-type dopants at a high concentration, is formed on the activation layer 140a.

A source metal layer 150 is formed on the ohmic contact layer 140b. The source metal layer 150 may include, but is not limited to, a molybdenum (Mo) or molybdenum (Mo) alloy. Forming of the source metal layer 150 may include a sputtering process, a CVD process or other process as is suitable for the purpose described herein.

A second photoresist layer is formed on the source metal layer 150. The second photoresist layer may be patterned to form second photoresist patterns PR21 and PR22. Forming the second photoresist patterns PR21 and PR22 may include a photolithographic process that uses a second mask MASK2.

The second photoresist patterns PR21 and PR22 are formed on a source electrode area SEA, a channel area CHA, a drain electrode area DEA, a storage area STA, a source pad area DPA and a source line area DLA. The source electrode 154 of the TFT is formed on the source electrode area SEA. The channel part 142 is formed on the channel area CHA. The drain electrode 156 is formed on the drain electrode area DEA. The storage common line STL is formed on the storage area STA. The source pad DP is formed on the source pad area DPA. The source lines DLm and DLm+1 are formed on the source line area DLA.

A first pattern PR21 among the second photoresist patterns PR21 and PR22 is formed on the source electrode area SEA, the channel area CHA, the drain electrode area DEA, the storage area STA, the source pad area DPA and the source line area DLA with a first thickness t1. A second pattern PR22 among the second photoresist patterns PR21 and PR22 is formed on the channel area CHA with a second thickness t2. The second pattern PR22 is patterned by a slit portion SLIT of the second mask MASK2 to form the second thickness t2 that is thicker than the first thickness t1. Alternatively, the second pattern PR22 may be formed using a half-tone mask.

Figure 5:
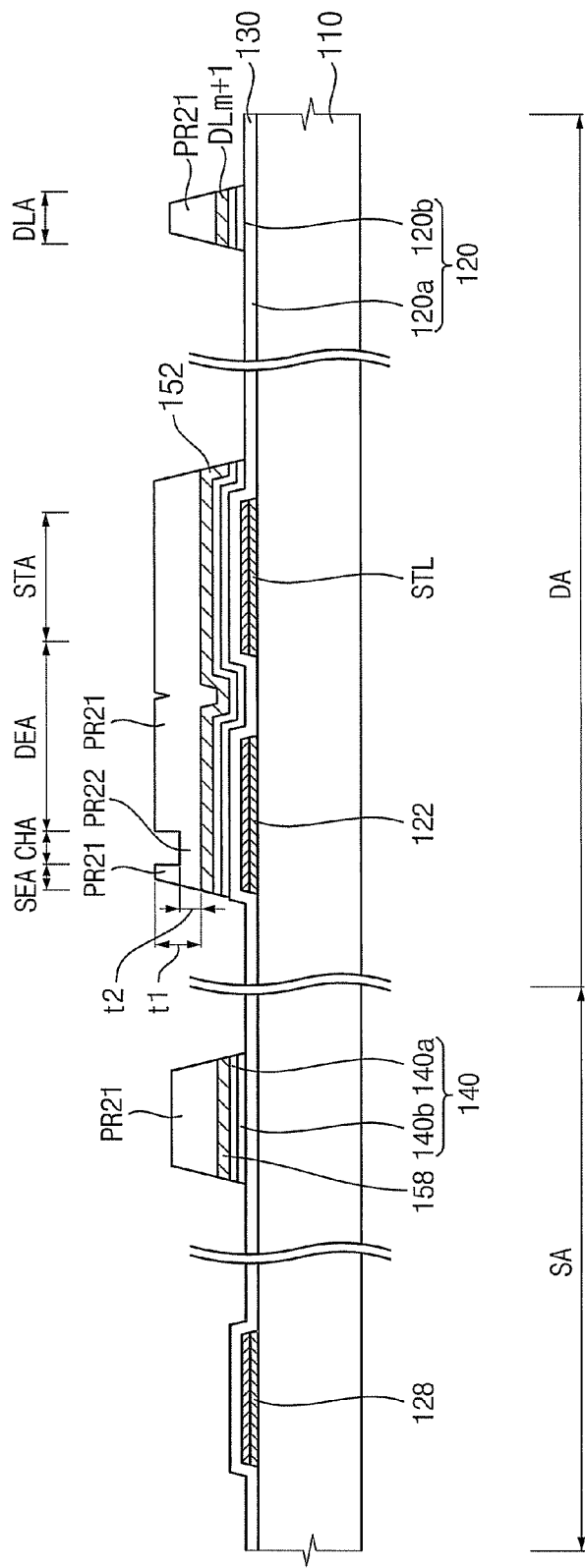

Referring to FIGS. 1 and 5, the source metal layer 150 is etched using the second photoresist patterns PR21 and PR22 to form a source pattern. The ohmic contact layer 140b and the activation layer 140a are etched by using the second photoresist patterns PR21 and PR22. Etching of the ohmic contact layer 140b and the activation layer 140a may include a dry etching process. Therefore, a channel layer 140 is formed below the source pattern, the channel layer being patterned with the source pattern.

The source pattern includes a first source pattern 152 and a source end portion pattern 158. The source pattern 152 is formed on the source electrode area SEA, the channel area CHA, the drain electrode area DEA and the storage area STA. The source end portion pattern 158 is formed on the source lines DLm and DLm+1 and end portions of the source lines DLm and DLm+1. The source lines DLm and DLm+1 intersect the gate lines GLn and GLn+1 to define a pixel part P on the base substrate 110. An area that is defined by a plurality of pixel parts P may be a display area DA that displays images An area in which the gate pads GP and the source pads DP are formed may be a peripheral area SA in which the images are not displayed.

A predetermined thickness of the second photoresist patterns PR21 and PR22 is removed. Removing of the second photoresist patterns PR21 and PR22 may include a plasma ashing process. Here, the removed thickness is greater than the second thickness t2 and is smaller than the first thickness t1.

Figure 6:
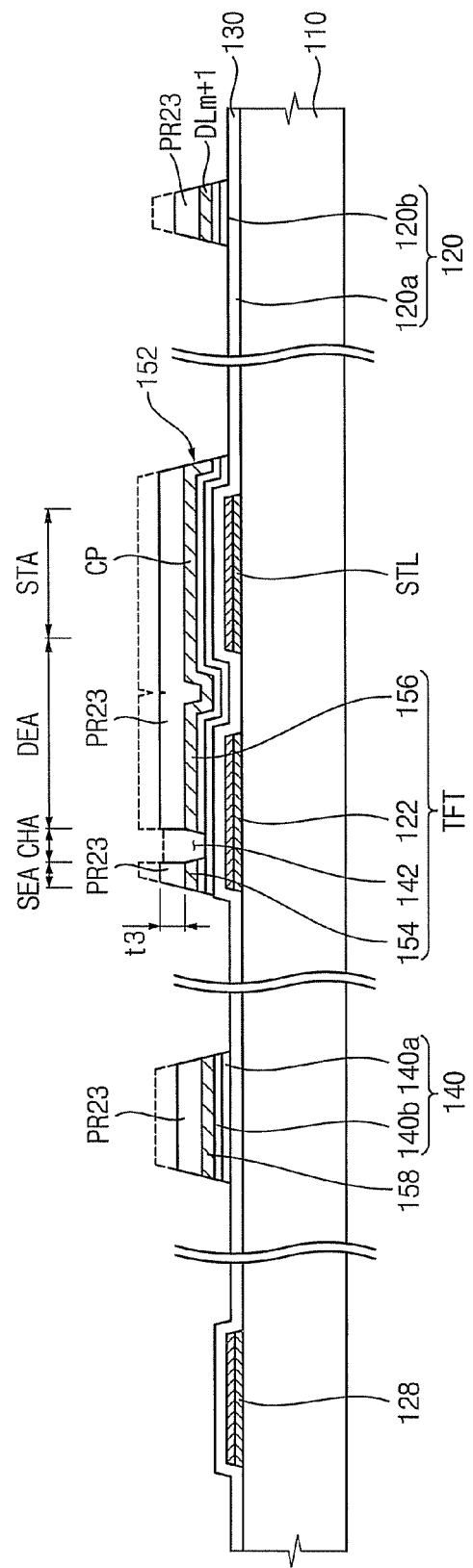

Referring to FIGS. 1 and 6, a second pattern PR22 that is formed on the channel area CHA is removed (as indicated by dotted lines), such as by using the ashing process, and a third pattern PR23 of a third thickness t3 remains on the source area SEA, the drain electrode area DEA and the storage area STA. Also, the third pattern PR23 remains on the source lines DLm and DLm+1 and the source end portion pattern 158.

A source electrode 154 and a drain electrode 156 that is separated from the source electrode 154 are formed by etching the first source pattern 152 by using the third pattern PR23. A cover pattern CP that covers the storage common line STL is electrically connected to the drain electrode 156 and is formed on the storage common line STL. In an exemplary embodiment, the drain electrode 156 may be defined in a non-overlapping area with the storage common line STL, and the cover pattern CP may be defined in an overlapping area with the storage common line STL.

The third pattern PR23 is removed, such as by an ashing process using oxide plasma. The ohmic contact layer 140b is etched using an etching mask, such as is used for the source electrode 154 and the drain electrode 156. Therefore, a channel section 142 that exposes the activation layer 140a in the channel area CHA is formed.

A resulting TFT array layer, which includes a TFT, gate lines GLn and GLn+1, source lines DLm and DLm+1 and a gate insulation layer 130, is formed on the base substrate 110. The TFT includes a gate electrode 122, a source electrode 154, a drain electrode 156 and a channel section 142.

Figure 7:
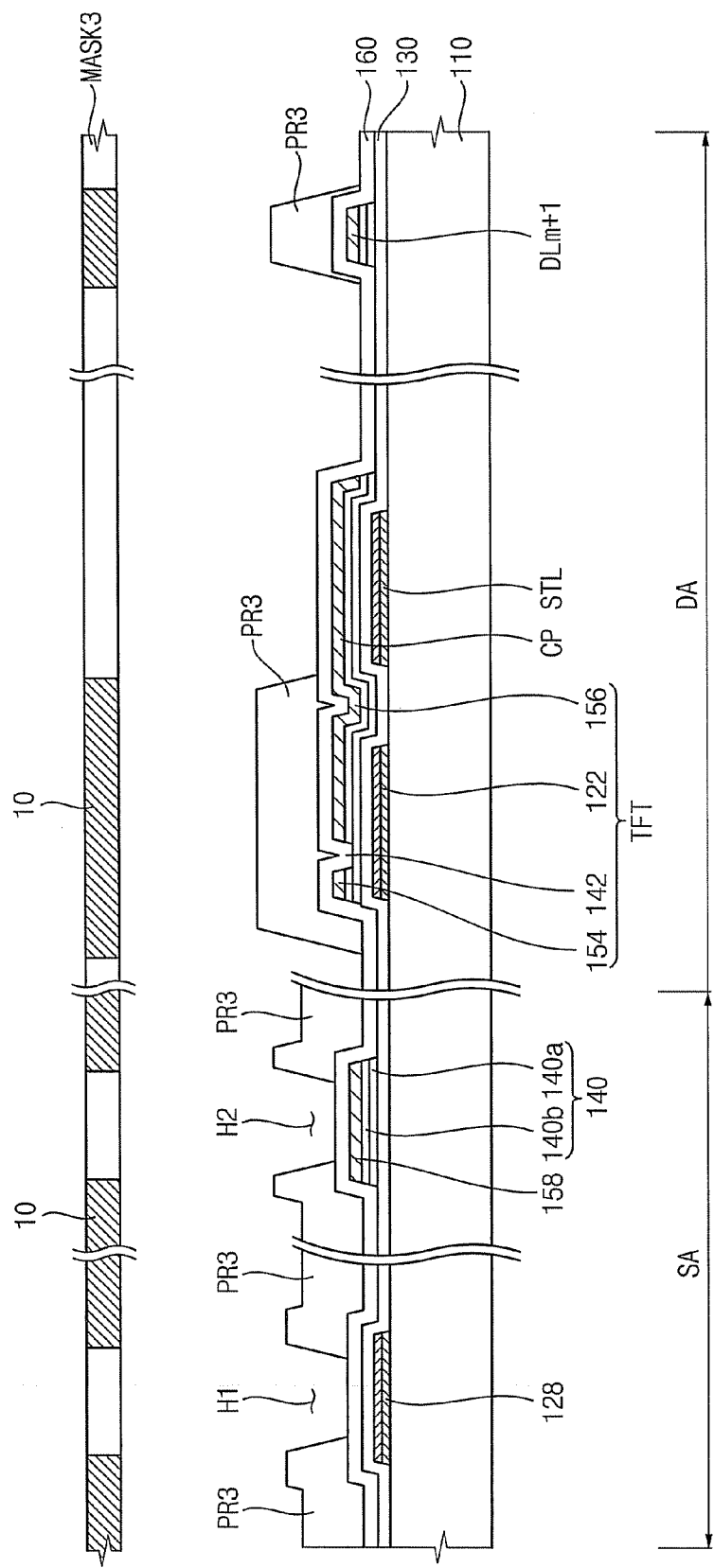

Referring to FIGS. 1 and 7, a passivation layer 160 is formed on the TFT array layer.

A third photoresist layer is formed on the passivation layer 160 Forming the third photoresist layer may include patterning by a photolithography process using a third mask MASK3 to form a third photoresist pattern PR3.

The third photoresist pattern PR3 is formed on the display area DA corresponding to the TFT, the gate lines GLn and GLn+1 and the source lines DLm and DLm+1. Also, the third photoresist pattern PR3 is formed on a full (e.g., entire) surface of the peripheral area SA. A first hole H1 and a second hole H2 that expose the passivation layer 160 are formed on the third photoresist pattern PR3 of the peripheral area SA corresponding to the gate end portion pattern 128 and the source end portion pattern 158, respectively.

Figure 8:
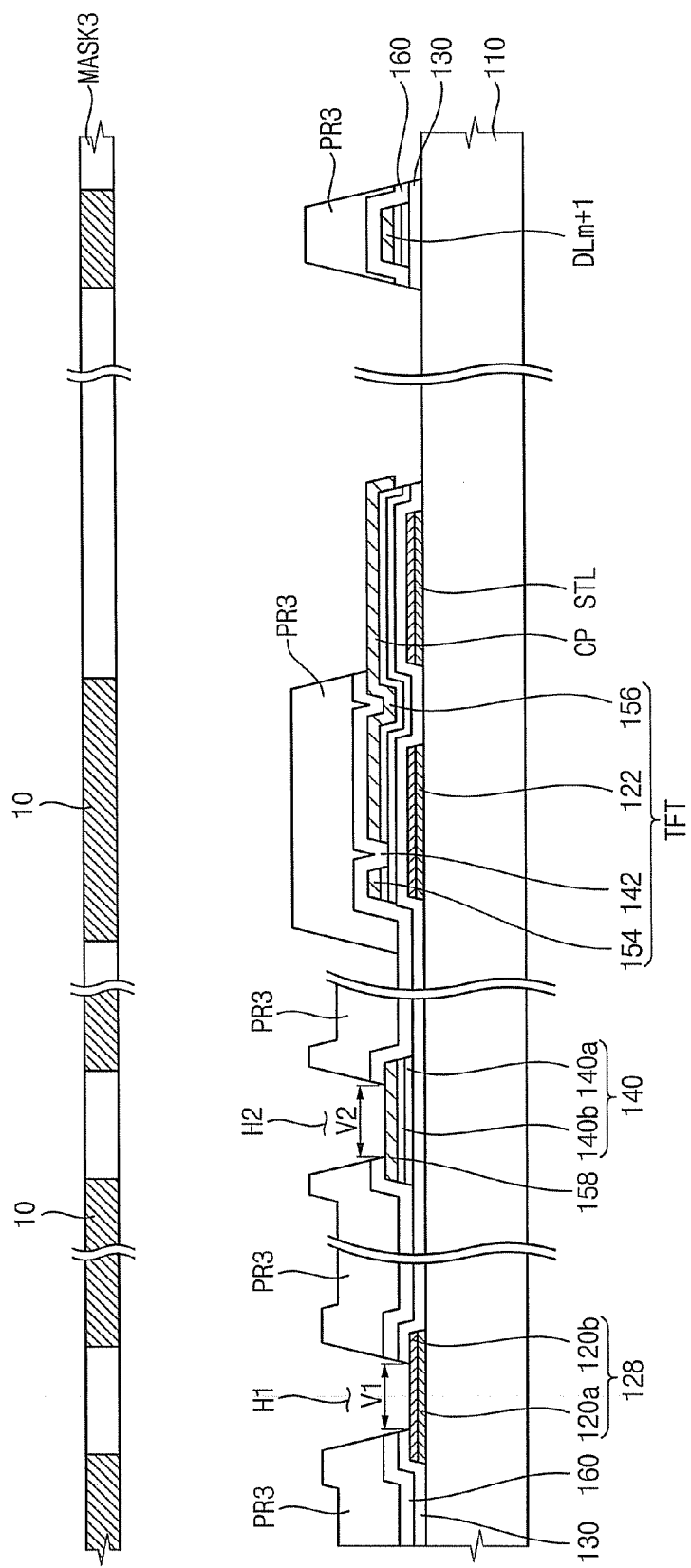

Referring to FIGS. 1 and 8, the gate insulation layer 130 and the passivation layer 160 are etched using a mask of the third photoresist pattern PR3. Etching the gate insulation layer 130 and the passivation layer 160 may include a dry etching process.

A portion of the base substrate 110 is partially exposed and the cover pattern CP that covers the storage common line STL is exposed.

Also, a first via hole V1 that partially exposes a portion of the gate end portion pattern 128 is formed in the gate insulation layer 130 and the passivation layer 160 corresponding to the first hole H1. A second via hole V2 that partially exposes a portion of the source end portion pattern 158 is formed in the passivation layer 160 corresponding to the second hole H2.

A portion of the passivation layer 160 remains on the TFT and source lines DLm, DLm+1. A portion of the gate insulation layer 130 and a portion of the passivation layer 160 remain on the gate lines GLn and GLn+1.

Figure 9:
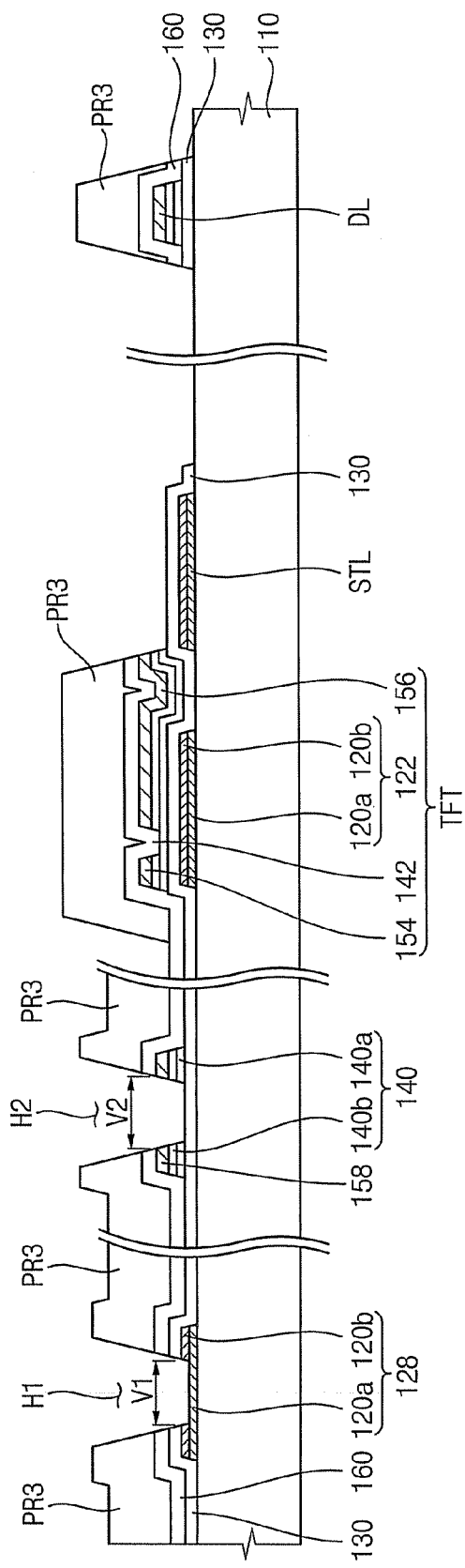

Referring to FIGS. 1, 8 and 9, the cover pattern CP that overlaps with the storage common line STL is etched using a mask of the third photoresist pattern PR3. Etching the cover pattern CP may include a dry etching process. In one exemplary embodiment, the cover pattern CP may be etched using a source gas as a mixture gas including chlorine ($Cl_2$) gas and oxygen ($O_2$) gas.

The channel layer 140 that is formed on the storage common line STL is exposed. Then, the exposed channel layer 140 is etched. Etching of the channel layer 140 may include a dry etching process using a source gas as a mixture gas including sulfur hexafluoride ($SF_6$) gas and chlorine ($Cl_2$) gas. A side surface of the drain electrode 156 is exposed through the above etching process and the gate insulation layer 130 remains on the storage common line STL.

The source end portion pattern 158 and the cover pattern CP are formed from same source metal layer, such that a source end portion pattern 158 corresponding to the second via hole V2 and the channel layer 140 below the source end portion pattern 158 are simultaneously etched during an etching process of the cover pattern CP and the channel layer 140. As a result, a side surface of the source end portion pattern 158, a side surface of the channel layer 140 and an upper surface of the gate insulation layer 130 are exposed in an area corresponding to the second via hole V2.

Similarly, a second metal layer 120b of the gate end portion pattern 128 may be formed from the same source metal layer, such that a second metal layer 120b corresponding to the first via hole V1 is etched during an etching process of the cover pattern CP. As a result, an upper surface of the first metal layer 120a and a side surface of the second metal layer 120b are exposed in an area corresponding to the first via hole V1.

Figure 10:
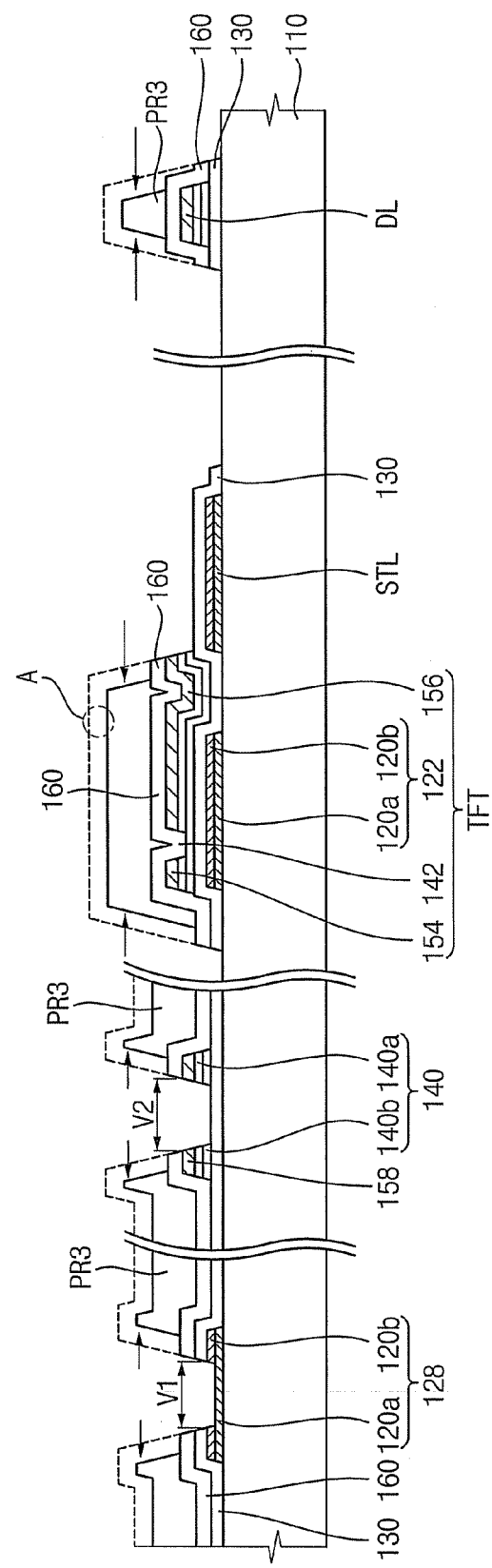

Referring to FIGS. 1 and 10, a portion of the third photoresist pattern PR3 is partially removed (e.g., as indicated by the dotted lines), such as through a plasma ashing process. An original thickness of the third photoresist pattern PR3 is decreased and the third photoresist pattern PR3 is reduced at a side surface of the drain electrode 156 by a predetermined interval. As a result, a portion of the passivation layer 160 that is formed on the drain electrode 156 is partially exposed.

Similarly, a portion of the third photoresist pattern PR3 that is formed in a peripheral area of the first via hole V1 and the second via hole V2 is partially removed, such that a portion of the passivation layer 160 that is formed in a peripheral area of the first via hole V1 and the second via hole V2 is partially exposed.

The ashing process is a process using oxide plasma collisions, such that a surface of the third photoresist pattern PR3 may be damaged by the oxide plasma collisions.

Figure 11:
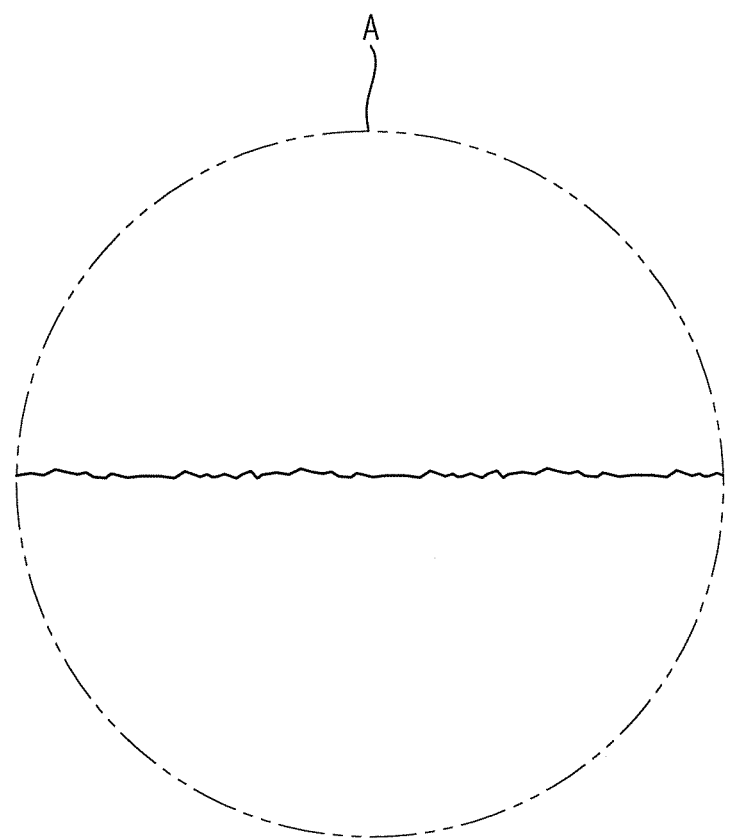
FIG. 11 is an enlarged view illustrating portion "A" in FIG. 10.

FIG. 11 is an enlarged view illustrating portion "A" in FIG. 10.

Referring to FIGS. 10 and 11, a surface of the third photoresist pattern PR3 becomes non-uniform due to damage from oxide plasma collisions. The non-uniform surface of the third photoresist pattern P3 remains after an ashing process.

Figure 12:
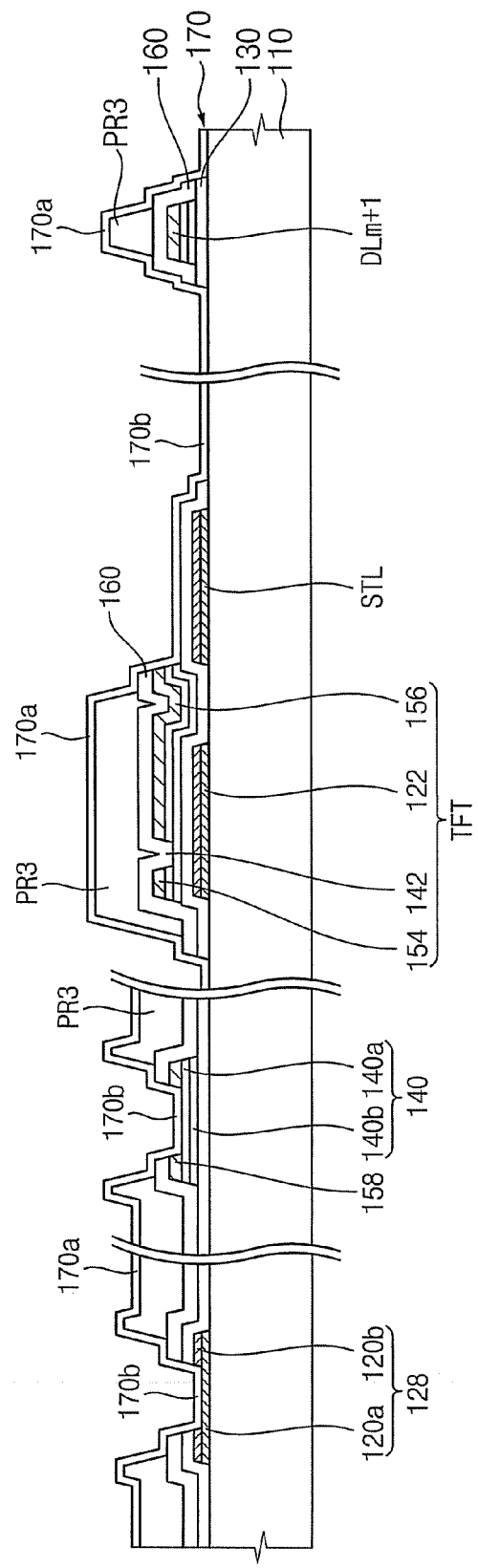

Referring to FIGS. 1, 10 and 12, a transparent electrode layer 170 is deposited on the base substrate 110 having the third photoresist pattern PR3 remaining thereon. The transparent electrode layer 170 may include a-ITO. Forming of the transparent electrode layer 170 may include a sputtering process, a CVD process or other process as is suitable for the purpose described herein.

The surface (e.g., outer or exposed surfaces) of the third photoresist pattern PR3 is non-uniform, such that an intermolecular spacing of a-ITO that is deposited on the third photoresist pattern PR3 (e.g., of the transparent electrode layer 170) is formed with a larger size than that of a-ITO that is deposited on a uniform surface. As in the illustrated embodiment of FIG. 12, an intermolecular spacing of a-ITO 170a that is deposited on the third photoresist pattern PR3 may be greater than that of a-ITO 170b that is formed on a remaining area on the substrate.

Figure 13:
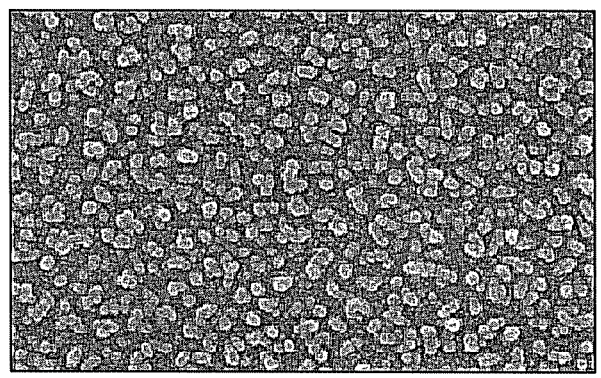
FIG. 13 is a scanning electron microscope ("SEM") image of an exemplary embodiment of amorphous indium tin oxide ("a-ITO") that is formed on a third photoresist pattern.
Figure 14:
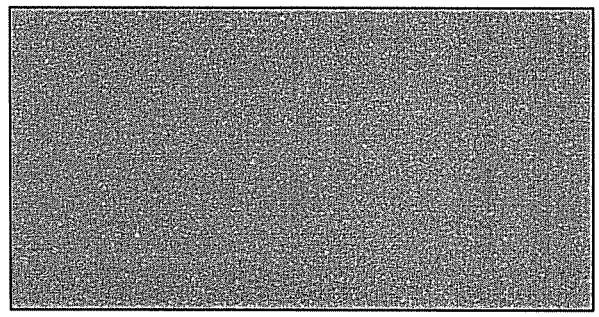
FIG. 14 is an SEM image of an exemplary embodiment of a-ITO that is formed on a remaining area of a substrate.

FIG. 13 is a scanning electron microscope ("SEM") image of an exemplary embodiment of a-ITO that is formed on a third photoresist pattern. FIG. 14 is a SEM image of an exemplary embodiment of a-ITO that is formed on a remaining area of a substrate.

Referring to FIGS. 13 and 14, an intermolecular spacing of the a-ITO 170a that is deposited on the third photoresist pattern PR3 is greater than that of a-ITO 170b that is formed on a remaining area on the substrate. The structure of the a-ITO 170a allows a solution to relatively easily infiltrate and dissolve the a-ITO 170a.

Figure 15:
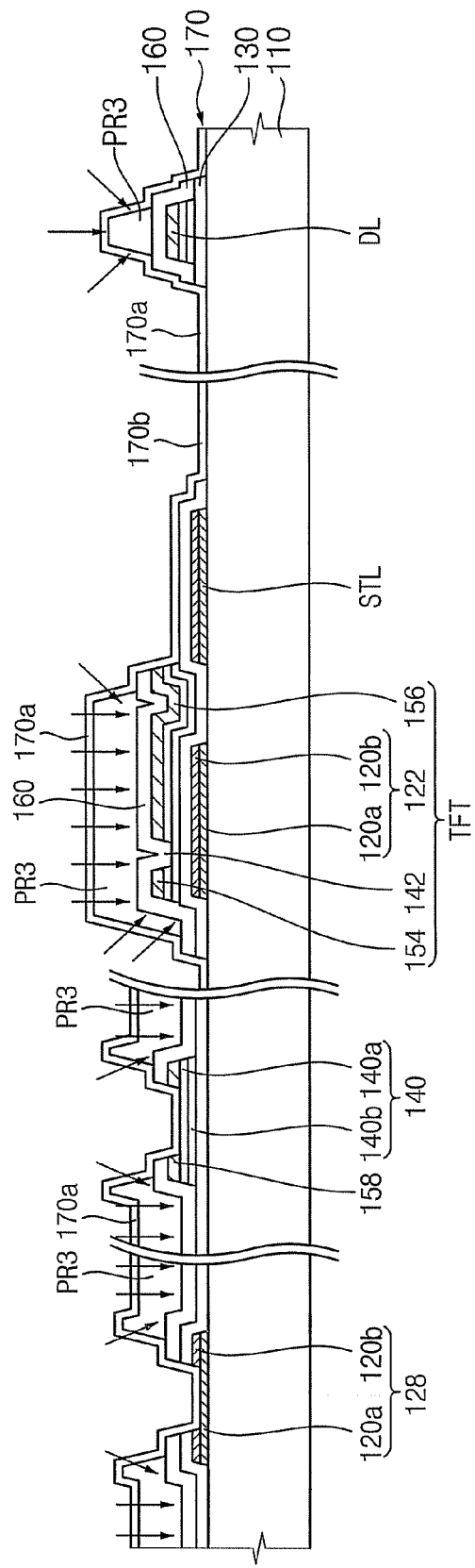

Referring to FIGS. 12 and 15, the base substrate 110 having the a-ITO 170 formed thereon is put in a strip solution that removes a photoresist pattern. In an exemplary embodiment, the strip solution may include an oxalic acid. The oxalic acid is a material having a predetermined etching capacity for the a-ITO 170.

An intermolecular spacing of the a-ITO 170a that is deposited on the third photoresist pattern PR3 is greater than that of a-ITO 170b that is formed on a remaining area on the substrate, such that an infiltrating of a strip solution into the a-ITO 170a may be possible. The strip solution is infiltrated into the third photoresist pattern PR3 through the a-ITO 170a that is deposited on the third photoresist pattern PR3 as shown by the downward arrows in FIG. 15. In an exemplary embodiment, the strip solution may be selectively infiltrated into the a-ITO 170a that is deposited on the third photoresist pattern PR3. As a result, the third photoresist pattern PR3 is removed from the base substrate 110, and substantially simultaneously, a-ITO 170a that is formed on the third photoresist pattern PR3 is also removed.

Referring again to FIGS. 1 and 2, the pixel electrode 172 corresponding to each of pixel parts P is patterned on the base substrate 110. Similarly, the first electrode 174 that contacts the etched surface of the second metal layer 120b of the gate end portion pattern 128 is formed on the gate end portion pattern 128 through the first via hole V1. Also, the second electrode 176 that contacts the etched surface of the source end portion pattern 158 is formed on the source end portion pattern 158 through the second via hole V2.

As in the illustrated embodiment, the strip solution may be infiltrated into the a-ITO 170a even though an undercut process for infiltrating a strip solution into the photoresist pattern is not performed, such that the pixel, first and second electrodes 172, 174 and 176 may be patterned. Advantageously, reliability for a patterning process of a pixel electrode may be enhanced. Additionally, a process for forming an undercut would be omitted, and a manufacturing process may be simplified.

In the illustrated embodiment, the strip solution including, but not limited to, an oxalic acid may be infiltrated into the a-ITO 170a that is formed on the third photoresist pattern PR3. The strip solution may dissolve the a-ITO 170a that is formed on the third photoresist pattern PR3 into a plurality of particles. Advantageously, a quantity of a remaining substance after performing a stripping process is reduced, such that a filter exchanging period for the strip solution and manufacturing costs may be reduced.

In the illustrated embodiment, the pixel electrode 172 contacts a side surface of the drain electrode 156. The pixel electrode 172 overlaps with a portion of the passivation layer 160 that is formed on the drain electrode 156 through an ashing process of the third photoresist pattern PR3 as described above. Advantageously, contact reliability of the pixel electrode 172 that contacts a side surface of the drain electrode 156 may be enhanced.

In the illustrated embodiment, the first electrode 174 is formed with a larger size than the first via hole V1 to overlap with the passivation layer 160 formed in a peripheral area of the first via hole V1 through an ashing process of the third photoresist pattern PR3. Advantageously, contact reliability of the first electrode 174 that contacts the etched surface of the second metal layer 120b may be enhanced.

In the illustrated embodiment, the second electrode 176 is formed with a larger size than the second via hole V2 to overlap with the passivation layer 160 formed in a peripheral area of the second via hole V2 through an ashing process of the third photoresist pattern PR3. Advantageously, contact reliability of the second electrode 176 that contacts the etched surface of the source end portion pattern 158 may be enhanced.

In the illustrated embodiment, an etching of the gate insulation layer is prevented using the cover pattern formed on the storage common line. Alternatively, a photoresist pattern with a relatively low thickness may be formed on the storage common line through a slit exposure and a forming of the cover pattern may be omitted, such that the etching of the gate insulation layer may be prevented.

As in the illustrated embodiments, the surface of the photoresist pattern is non-uniformly formed by the oxide plasma, such that the a-ITO having an intermolecular spacing allowing easy infiltration of a strip solution into the a-ITO may be formed on the photoresist pattern. The strip solution is selectively infiltrated into the a-ITO that is formed on the photoresist pattern during a following strip process, such that the photoresist pattern and the a-ITO that are formed thereon may be selectively removed. Advantageously, reliability for a patterning process of a pixel electrode may be enhanced. Additionally, a process for forming an undercut may be omitted, and a manufacturing process may be simplified.

As in the illustrated embodiments, the strip solution is selectively infiltrated into the a-ITO that is formed on the photoresist pattern and the strip solution may dissolve the a-ITO into a plurality of particles. As a result, a quantity of the remaining substance after performing a stripping process is reduced, such that a filter exchanging period for the strip solution and manufacturing costs may be reduced.

As in the illustrated embodiments, a portion of the photoresist pattern is partially removed through oxide plasma collisions, such that the pixel electrode may be overlapped with a portion of the passivation layer that is formed on the drain electrode. Advantageously, contact reliability of the pixel electrode that contacts a side surface of the drain electrode of the TFT may be enhanced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display substrate comprising:
   a first metal pattern including a first metal layer and a second metal layer forming a gate line extended to a first direction, a gate end portion pattern, and a gate electrode of a thin-film transistor ("TFT");
   a second metal pattern including a source line, a source electrode, and a drain electrode of the TFT, the source line being extended to a second direction substantially perpendicular to the first direction;
   a passivation layer on the gate line, the source line and the TFT;
   a first via hole exposing a side surface of the first metal layer of the gate end portion pattern;
   a first electrode contacting the side surface of the first metal layer of the gate end portion pattern; and
   a pixel electrode which contacts an end side surface of the drain electrode in a plan view, the pixel electrode overlapping with a portion of the passivation layer on the drain electrode, the portion being extended from the end side surface of the drain electrode.

2. The display substrate of claim 1, further comprising a plurality of gate lines,
   wherein the first metal pattern further includes a storage common line extended substantially parallel with the gate lines and disposed between adjacent gate lines.

3. The display substrate of claim 1, further comprising a channel layer formed under the second metal pattern.

4. The display substrate of claim 1, wherein the pixel electrode comprises amorphous indium tin oxide ("a-ITO").

5. The display substrate of claim 1, wherein the pixel electrode contacts an outer side surface of the passivation layer.

6. The display substrate of claim 3, wherein the pixel electrode contacts an outer side surface of the channel layer under the second metal pattern.

7. The display substrate of claim 1, wherein
   the first metal layer, the second metal pattern, the passivation layer and the pixel electrode are on a base substrate, and
   the pixel electrode contacts the base substrate.

* * * * *